UNITED STATES PATENT OFFICE.

GUSTAVE XAVIER DIME, OF NEW YORK, N. Y.

FIREPROOFING COMPOSITION.

SPECIFICATION forming part of Letters Patent No. 627,988, dated July 4, 1899.

Application filed February 1, 1899. Serial No. 704,205. (No specimens.)

*To all whom it may concern:*

Be it known that I, GUSTAVE XAVIER DIME, a citizen of the United States, residing at New York, in the county of New York and State of New York, have invented a certain new and useful Composition of Matter, of which the following is a full and complete specification, such as will enable those skilled in the art to which it appertains to make and use the same.

My new composition is designed for use in the treatment of wood, fabrics, laces, and other similar articles; and it consists of the following ingredients, combined substantially in the proportions stated: chloride of ammonium, 92.88 parts; carbonate of ammonium, 0.46 part; microcosmic salt, 6.66 parts. Total, one hundred parts.

In addition to the above ingredients I may employ a certain quantity of ammonium alum which in treating wood with the resulting composition will draw the fibers of the wood more closely together, aiding in the preservation thereof against moth and decay and adding greatly to the strength of the wood.

The microcosmic salt above specified may be used either in a dry state or in the form of a concentrated solution, and in practice the chloride of ammonium and carbonate of ammonium are first mixed in solution and the resulting mixture is filtered and crystallized, if desired, and then mixed with the microcosmic salt. I use this mixture of chloride of ammonium and carbonate of ammonium because the results obtained thereby are vitally superior to the results obtained from the use of either commercial ammonium chloride or the alleged "chemically-pure" ammonium chloride. Each of these latter substances possesses hygroscopic qualities, due to the free acid contained therein, and the hygroscopic qualities render the use of the respective substances exceedingly undesirable. The commercial ammonium chloride also contains numerous impurities, which if the latter were used would discolor fabrics treated therewith.

Mixing ammonium carbonate with ammonium chloride in the proportion specified neutralizes the free acid in the latter, destroying the hygroscopic qualities thereof and at the same time renders insoluble the lime and iron which may be therein, neutralizing any discoloring tendency the ammonium chloride may possess.

If wood is to be treated or rendered fireproof, the said composition is dissolved or reduced to the form of a solution and heated, and the wood after having been first thoroughly dried in a kiln or in any suitable manner is immersed in said solution, and the said solution is preferably retained in a heated condition, and the wood remains therein until it is thoroughly saturated or soaked with the solution and sinks to the bottom thereof, after which it is taken out and dried for use.

Before subjecting wood to treatment with my fireproofing composition I may find it preferable to treat the wood with steam, which latter treatment opens up the pores of the wood, allowing an increased penetration thereof by the fireproofing composition.

If a fabric, lace, or similar article is to be treated, it is simply immersed in the solution and taken therefrom and dried.

If the composition is used in connection with celluloid, it is placed in the material of which the celluloid is composed when the latter is being made, the composition being dry or in the form of a powder and constituting about one-quarter in weight of the substance from which the celluloid is made.

When the composition of chloride of ammonium, carbonate of ammonium, and microcosmic salt compounded as above described is reduced to solution and heated, the following chemical reaction takes place: Microcosmic salt no longer exists, but is replaced by dihydrogen sodium orthophosphate. When cooled, this latter is replaced by sodium hexametaphosphate.

My improved composition is perfectly adapted to accomplish the result for which it is intended and is much cheaper to manufacture than any other article of this class heretofore produced, and any article treated therewith is rendered absolutely fireproof.

It will also be apparent that many other articles besides those hereinbefore named may be treated in a similar manner or for a similar purpose, and the proportions of the parts specified may be slightly changed without altering the character of the composition.

Having fully described my invention, I claim as new and desire to secure by Letters Patent—

1. The herein-described composition of matter, consisting of chloride of ammonium, carbonate of ammonium and microcosmic salt, substantially as described and for the purpose specified.

2. The herein-described composition of matter, consisting of chloride of ammonium, 92.88 parts, carbonate of ammonium 0.46, and microcosmic salt 6.66 parts, substantially as described and for the purpose specified.

In testimony that I claim the foregoing as my invention I have signed my name, in presence of the subscribing witnesses, this 27th day of January, 1899.

GUSTAVE XAVIER DIME.

Witnesses:
 WALTER L. GRAHAM,
 SAMUEL L. PATTERSON.